United States Patent
Wolfovitz

(10) Patent No.: US 10,007,746 B1
(45) Date of Patent: Jun. 26, 2018

(54) METHOD AND SYSTEM FOR GENERALIZED NEXT-STATE-DIRECTED CONSTRAINED RANDOM SIMULATION

(71) Applicant: CADENCE DESIGN SYSTEMS, INC, San Jose, CA (US)

(72) Inventor: Guy Wolfovitz, Hadera (IL)

(73) Assignee: Cadence Design Systems, Inc., San Jose, CA (US)

( * ) Notice: Subject to any disclaimer, the term of this patent is extended or adjusted under 35 U.S.C. 154(b) by 36 days.

(21) Appl. No.: 15/292,292

(22) Filed: Oct. 13, 2016

(51) Int. Cl.
*G06F 17/00* (2006.01)
*G06F 17/50* (2006.01)

(52) U.S. Cl.
CPC ................. *G06F 17/5022* (2013.01)

(58) Field of Classification Search
USPC .......................................................... 716/106
See application file for complete search history.

(56) References Cited

U.S. PATENT DOCUMENTS

| | | | | |
|---|---|---|---|---|
| 2007/0273408 A1* | 11/2007 | Golic | ..................... | G06F 7/584 326/93 |
| 2008/0288909 A1* | 11/2008 | Leijten-Nowak | ... | G06F 17/5054 716/128 |
| 2009/0222393 A1* | 9/2009 | Ganai | ..................... | G06F 17/11 706/46 |

\* cited by examiner

*Primary Examiner* — Mohammed Alam
(74) *Attorney, Agent, or Firm* — Pearl Cohen Zedek Latzer Baratz LLP

(57) ABSTRACT

A system and method for generalized next-state-directed constrained random simulation may include obtaining an initial state for a finite state machine (FSM) constrained by a first Boolean random circuit; and unrolling the FSM, wherein each step of steps of the unrolling, except for a final step, is constrained by the first Boolean random circuit that defines a set of generalized cycles, and wherein the final step is constrained by a second Boolean random circuit.

12 Claims, 6 Drawing Sheets

---

Obtain an initial state for a finite state machine (FSM) constrained by a first Boolean random circuit
302

Unroll the FSM, wherein each step of steps of the unrolling, except for a final step, is constrained by the first Boolean random circuit that defines a set of generalized cycles, and wherein the final step is constrained by a second Boolean random circuit
304

300

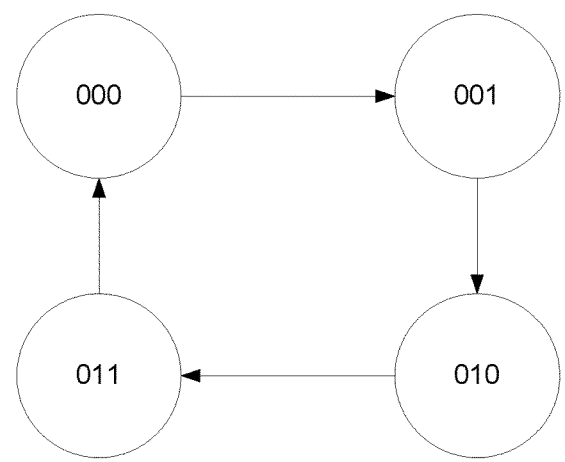
Fig. 1C
Fig. 1D

Prior art

METHOD AND SYSTEM FOR GENERALIZED NEXT-STATE-DIRECTED CONSTRAINED RANDOM SIMULATION

FIELD OF THE INVENTION

The present invention relates to a system and method for generalized next-state-directed constrained random simulation.

BACKGROUND OF THE INVENTION

Design verification is a common process for testing a newly designed integrated circuit board, or system-level architecture, to confirm that it complies with the requirements defined by the specification of the architecture for that device. Design verification for a device under test (DUT) may be performed on the actual device, but usually a simulation model of the device is tested.

There are typically two main types of design verification methods: dynamic verification (also known as "experimental verification" or "test verification"), which tests the DUT by providing inputs to the DUT (typically via a testbench) and checking outputs from the DUT, and formal verification, which analyses the DUT to determine its correctness. The two most popular methods for automatic formal verification are language containment and model checking.

Constrained random verification may involve choosing a suitable hardware verification language (HVL), defining a testbench architecture and producing constraints to be used for generating proper (legal) random stimuli. When the testbench is used in simulating a DUT, a random seed value and a simulator may become part of the verification environment. The seed may help in reproducing a failure (bug) if the other inputs (e.g., the testbench architecture—components hierarchy and the set of constraints used) remain constant. Any change to these inputs may lead to different results despite using the same seed value. The random seed value and the constraints may be fed or provided to a constraint solver which is typically, in many cases, an integrated part of the simulator, to generate random values.

SUMMARY OF THE INVENTION

There is thus provided, in accordance with some embodiments of the present invention, a system and method for generalized next-state-directed constrained random simulation. The system and method may include obtaining an initial state for a finite state machine (FSM) constrained by a first Boolean random circuit. The method may also include unrolling the FSM, wherein each step of steps of the unrolling, except for a final step, is constrained by the first Boolean random circuit that defines a set of generalized cycles, and wherein the final step is constrained by a second Boolean random circuit.

In some embodiments of the invention, the system and method may also include checking in each of the steps whether a property holds for that step.

According to some embodiments of the invention, the system and method may also include providing to a satisfiability problem (SAT) solver an initial state function relating to the FSM to obtain the initial state.

In some embodiments of the invention, obtaining the initial state may include generalizing the initial state using the first Boolean random circuit that is chosen at random from a set of Boolean circuits that accept that initial state.

In some embodiments, at a kth step (k>1), the unrolling includes k−1 generalized cycles, and is extended by finding a state $s_k$ for which the following formula is satisfiable:

$$I(s_1) \wedge \bigwedge_{i=1}^{k-1} [R_i(s_i) \wedge Tr(s_i, s_{i+1})] \wedge Q(s_k)$$

Where $I(s_1)$ is an initial state function, $R_i$ is the first Boolean random circuit that is chosen at random from a set of Boolean circuits that accept that initial state, Tr is a transition function, and Q is the second random Boolean circuit; and generalizing using a third Boolean random circuit $R_k$ chosen at random from the set of Boolean circuits that accept state $s_k$.

In some embodiments of the invention, if no satisfying assignment is found for the formula performing a backstep.

In some embodiments of the invention if no satisfying assignment is found for the formula then a new initial state is assigned.

There is also provided in accordance with some embodiments of the invention, a system for generalized next-state-directed constrained random simulation. The system may include a memory, and a processor configured to: provide a satisfiability problem (SAT) solver with an initial state function relating to an FSM; obtain an initial state from the SAT solver for a FSM constrained by a first Boolean random circuit; and unroll the FSM, wherein each step of steps of the unrolling, except for a final step, is constrained by the first Boolean random circuit that defines a set of generalized cycles, and wherein the final step is constrained by a second Boolean random circuit.

In some embodiments of the invention, there is also provided a non-transitory computer readable storage medium for generalized next-state-directed constrained random simulation, having stored thereon instructions that when executed by a processor will cause the processor to perform methods as described herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1C depicts a FSM of a counter, which may relate to a system or method for generalized next-state-directed constrained random simulation according to some embodiments of the present invention.

FIG. 1D shows a trace, which is a sequence of consecutive states of the FSM of FIG. 1C.

Figure 1A:
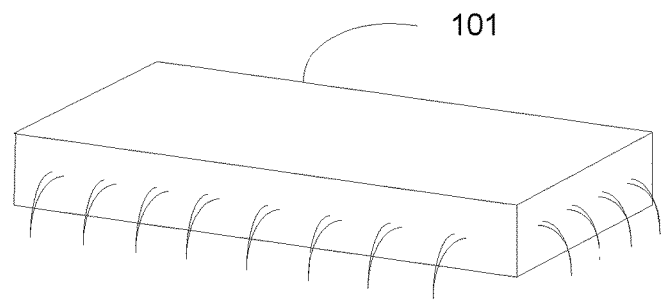
FIG. 1A depicts an electronic chip, which may be the final result in a process of designing and producing an electronic circuit, which involves applying a system or method for generalized next-state-directed constrained random simulation according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The present invention relates to a method and system for generalized, next-state-directed constrained random simulation of a DUT (a design of an electronic circuit, e.g., a chip).

Electronic Design Automation (EDA) tools (e.g. formal verification tools) are known that may take a model (e.g., in Verilog) of a DUT and transform it into a FSM) representation.

Figure 1B:
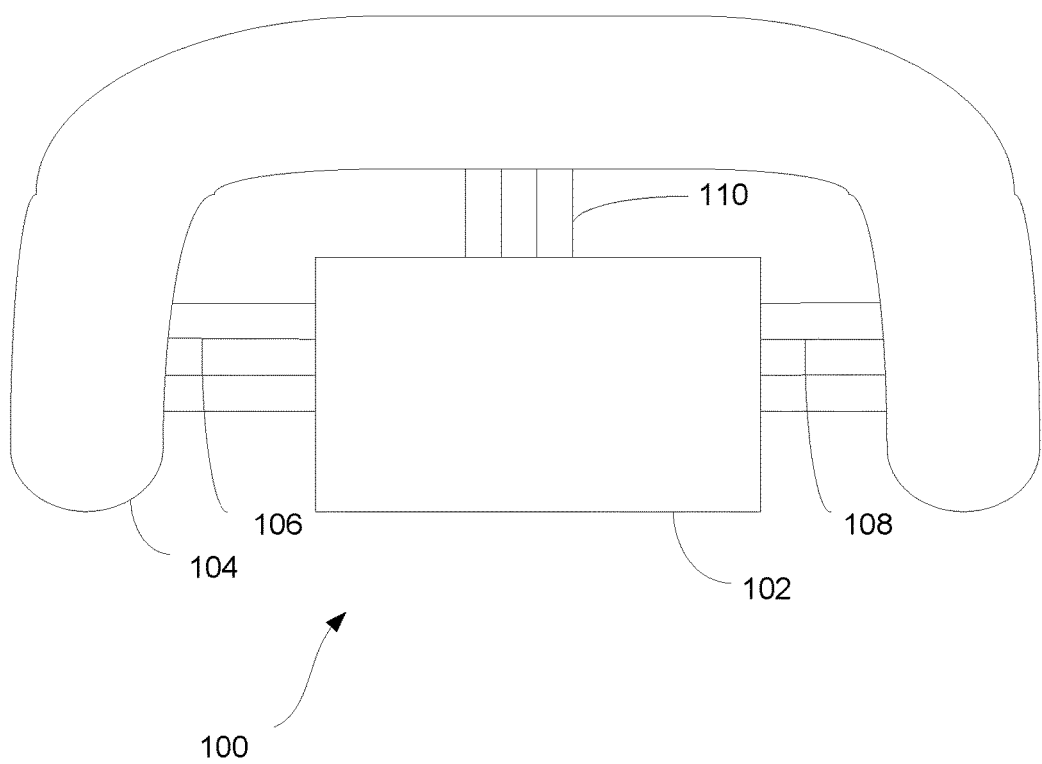
FIG. 1B schematically illustrates a system for simulating a DUT that includes a simulated DUT and a testbench, which may be part of a process of designing and producing an electronic circuit, which involves applying a system or method for generalized next-state-directed constrained random simulation according to some embodiments of the present invention.

A FSM is a mathematical model that is used in designing sequential logic circuits to model a design of an electronic circuit (e.g., an electronic chip, such as the chip 101 depicted in FIG. 1A, which may be the final result in a process of designing and producing an electronic circuit, which involves applying a system or method for generalized next-state-directed constrained random simulation according to some embodiments of the present invention). FIG. 1B schematically illustrates a system for simulating a DUT 100, which may be part of a process of designing and producing an electronic circuit, which involves applying a system or method for generalized next-state-directed constrained random simulation according to some embodiments of the present invention. System 100 may include a simulated DUT 102 (a simulation model of a planned design for an electronic circuit, e.g., chip) and a testbench 104. Stimuli may be provided via inputs 106 by the testbench 104 to DUT 102, and outputs from the DUT may be passed via outputs 108 to the testbench 104. Controls 110 may also be used (this is a typical dynamic verification setup).

A FSM is defined by its initial states, a list of possible states and the trigger condition for each transition from one state to another. At any point in time the FSM is in one state (referred to as "the current state").

An execution of a concurrent program may be viewed as an infinitely large sequence of states. Each state, after the initial state, is a result of an execution of an action on the previous state. A property is a set of such sequences. Since a program may also define a set of sequence of states, it can be said that a property holds for a program if the set of sequences defined by that program is contained in the set of sequences defined by that property. Properties may be expressed in assertion languages such as SVA (system Verilog assertions), PSL (property specification language)—mainly used in industry, and LTL (linear temporal language), or CTL (computation tree logic)—mainly used by academics.

A model of a system (e.g., FSM) may be subjected to model checking (or property checking) to determine whether the model meets a required specification.

Typically, there are two kinds of properties: safety and liveness. A safety property is directed at ensuring that nothing "bad" happens during execution of the program. For example, safety properties may include mutual exclusion, deadlock freeness, partial correctness, and first-come-first-serve. In mutual exclusion, the proscribed "bad" thing or event happens when two processes get executed in critical sections at the same time. In deadlock freeness it is deadlock. In partial correctness the "bad" thing is terminating in a state not satisfying the postcondition. Finally, in a first-come-first-serve, which dictates that requests are serviced in the order of their appearance, the "bad" thing is servicing orders not in the order in which they were made. Liveness properties are aimed at ensuring that "good" things always or eventually happen during the execution of a program. Examples of liveness properties may include starvation freedom, termination, and guaranteed service. In starvation freedom, which states that a process makes progress infinitely, the "good" thing is making progress. In termination, which asserts that a program does not run forever, the "good" thing is completion of the final instruction. Finally, in guaranteed service, which states that every request is serviced eventually, the "good" thing is receiving the service.

Consider the example shown in FIG. 1C, depicting a FSM of a counter of three registers. The counter depicted in this figure starts the count with an initial state of 000 (0 in binary notation), then transits to 001 (1), then 010 (2), 011 (3) and then resets to zero (000) again. This sequence is designed to be repeated. Other possible values for three registers include 100 (4 in binary notation), 101 (5), 110 (6) and 111 (7), as there are no more possibilities for a number which is made up of three registers, but the latter values ought not to be reachable from an initial state if the counter is to work properly.

A trace, which is a sequence of consecutive states of the FSM as it transmits from state to state, for the FSM of FIG. 1C is shown in FIG. 1D. Shown are the first 6 states, which, in principle, may be followed indefinitely or practically indefinitely by further next states.

A counter-example (CEX) for a safety property may be singular. It may be enough to produce an example which proves that the safety property was not observed. After discovering a counter example, debugging may take place in which the reason for facilitating the counter example may be searched and fixed. In the example shown in FIG. 1C, a counter example for the property "the counter never reaches 3" may be the sequence of states counter=0, counter=1, counter=2, counter=3.

In the past (many years ago) explicit model checking was performed, which included writing up an FSM for an entire system in memory and searching for counter examples in the FSM that defy required properties.

However, nowadays it is practically virtually impossible to explicitly write up an FSM that includes all of the possible states of a DUT. The entire set of combinations of values for each register in a DUT that includes a plurality of registers is practically infinite.

Implicit model checking was introduced which uses Boolean functions that describe implicitly the links between the states. For example a FSM may be expressed by the following example relations:

$S = \{s1, s2, s3 \ldots sn\}$, where $si$ is a Boolean variable of state $s$ $$I(s1, s2, s3, \ldots sn) = \begin{pmatrix} 1, & \text{if } s1, s2, s3, \ldots sn \text{ is an intial state} \\ 0, & \text{otherwise} \end{pmatrix}$$

$$Tr(s1, s2, s3, \ldots sn, s'1, s'2, s'3 \ldots s'n) = \begin{pmatrix} 1, & \text{if } \exists \text{ transition from } s \text{ to } s' \\ 0, & \text{otherwise} \end{pmatrix}$$

A property may be described in a Boolean function form, for example $$P(s1, s2, s3, \ldots sn) = \begin{pmatrix} 1, & \text{if the property holds for } s \\ 0, & \text{otherwise} \end{pmatrix}$$

Thus, typically, the input to the model checker comprises I, Tr and P, I is the cluster of initial states that may be represented in a Boolean circuit, Tr is the cluster of transitions between the states, which may also be represented by a Boolean circuit, and P is the property considered, which is to hold, and may also be represented by a Boolean circuit.

There are generally two types of model checkers: proof-directed model checkers and CEX directed model checkers.

Proof-oriented model checkers are basically model checkers that, given enough execution run time and memory to use, may eventually return a definitive output confirming that the examined property holds for the FSM or find a counter example which defies the examined property.

CEX-oriented model checkers do not attempt to cover the entire FSM, instead they concentrate in attempting to provide a counter-example.

Specifically, a bounded model checker is a special example of a CEX-oriented model checker. Bounded model checking algorithms unroll the FSM for a fixed number of steps (or cycles), k, (defining a set of "traces") and check whether a property violation may occur in k or fewer steps. Typically this involves encoding the unrolled model as an instance of a Boolean satisfiability problem (sometimes referred to as "SAT"). In an unrolling process the behavior of a sequential circuit over a number of time frames may be modeled using a conventional time frame expansion approach, which creates combinational circuit by unrolling the next state function of the sequential circuit (see also FIGS. 2A and 2B and related explanation hereinafter). Typically the bounded model checker recursively checks the model for an increasing number of steps until all possible property violations have been ruled out.

A Boolean function is considered satisfiable if there is an assignment to its variables such that that function evaluates to "1" (and is considered unsatisfiable otherwise).

Thus, a BMC may start by using a SAT solver to consider the initial states of the FSM by referring, for example, to the following function:

$$BMC_1(s_1, s_2, \ldots s_n) = I(s_1, s_2 s_n) \wedge \rceil P(s_1, s_2, \ldots s_n)$$

Next the SAT solver checks the following step:

$$BMC_2 = I(s) \wedge Tr(s, s') \wedge \rceil P(s')$$

Yet another following step is then considered:

$$BMC_3 = I(s) \wedge Tr(s, s') \wedge Tr(s', s'') \wedge \rceil P(s'')$$

This may go on fork steps, where k is an arbitrary number that a designer may choose, that would make the designer comfortable with the model checking results.

The general expression for this is:

$$BMC_k = I(r_0) \wedge \left[ \bigwedge_{i=0}^{k-1} Tr(r_i, r_{i+1}) \right] \wedge \rceil P(r_k)$$

The next step is considered only if the current step the Boolean function of the BMC for that step is found to be unsatisfiable. If the Boolean function of the BMC relating to a particular step is found to be satisfiable, then that step is declared as a counter example.

Bounded model checking may encounter situations with high complexity that entail heavy use of computing resources in employing a SAT solver.

Figure 2A:
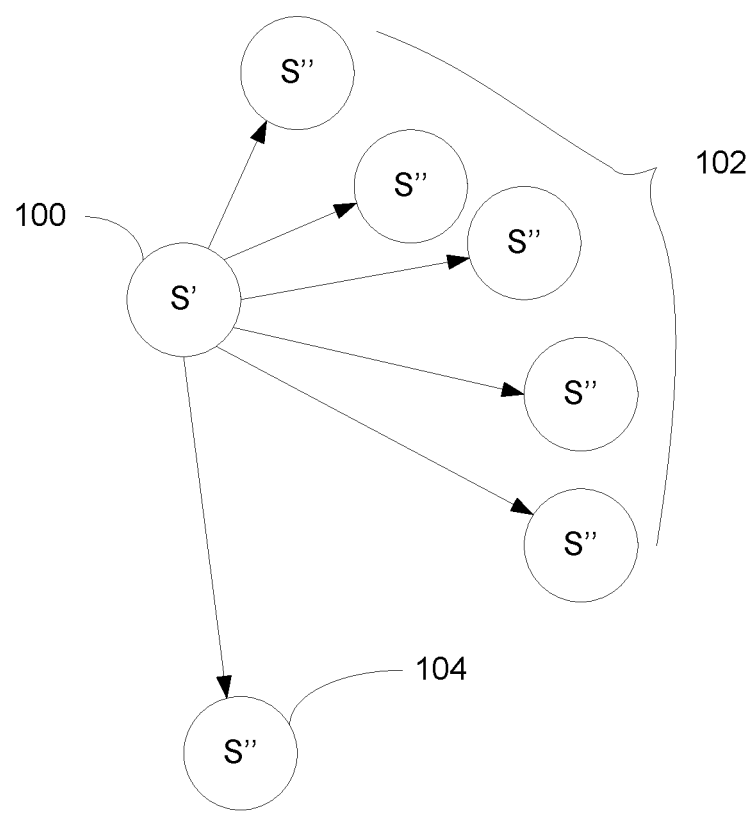
FIG. 2A depicts an excerpt of a FSM showing possible transitions from one state to other states.
Figure 2B:
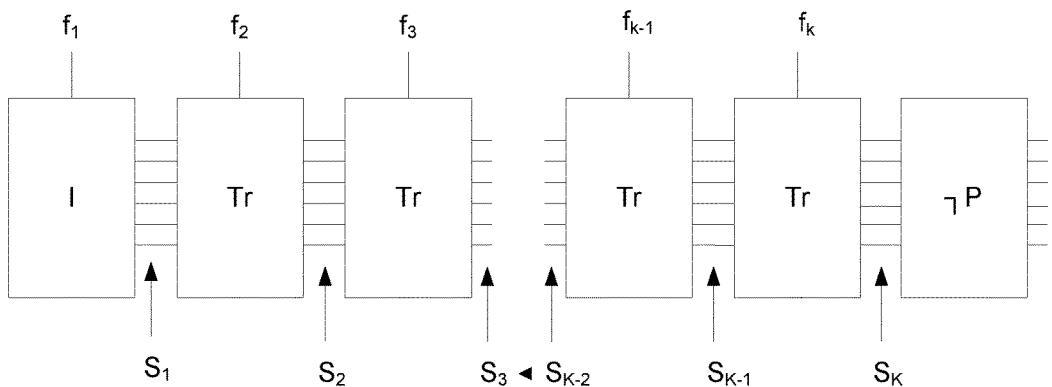
FIG. 2B (prior art) illustrates an iterative logic array (ILA) representation of a sequential circuit unrolling an FSM according to bounded model checking (BMC) approach.

FIG. 2B (prior art) illustrates an iterative logic array (ILA) representation of a sequential circuit unrolling an FSM according to BMC approach. Unrolling a sequential circuit for BMC with a SAT solver into a combinational circuit reduces the sequential problem to a combinational problem.

A typical BMC unrolling is carried out in cycles, each cycle represented by 1, 2, 3, 4 . . . up to k blocks, fork cycles.

A typical BMC unrolling starts with a first step where only the left-most block representing the function I (I is the initial state function of the FSM) with state $s_1$ as the input and the last block ("not P") are unrolled. In the second step the first, second and last blocks unroll, where the second block represent the transition function Tr between states of the FSM and takes as input $S_1$ and $S_2$. In the third step the first, second third and last block unroll. Similarly the unrolling continues for k cycles, until all blocks unroll. Each block outputs a value (1 or 0, for true or false, respectively) for its function ($f_1$, $f_2$, $f_3$ . . . $f_k$).

Random constrained simulation (RCS) was therefore previously introduced that seeks to find counter examples in the following, less resource-consuming, manner. In RCS the SAT solver generates a random initial state and from that random initial state a randomized SAT solver is used to generate a next state, which is made the current state, and repeats this. Constrained random simulation addresses two major problems of the traditional testbench approach: being procedural as opposed to declarative and being enumerative as opposed to comprehensive.

Constraints are formal and unambiguous specifications of design behaviors and aspects. In the context of constrained random simulation, constraints define what input combinations can be applied and when. There are basically two types of constraints in constrained random simulation: the environment constraints and constraints used as test directives. The former defines the interface protocol, which must be strictly followed. The latter are used on top of the environment constraints to steer the simulation to the desired test scenarios, the so-called "corner cases." In other words, constrained random simulation is meaningful only if the test stimuli meet certain requirements of the environment, and can become more interesting with the help of additional test directives.

However, using the RCS approach cannot guarantee good coverage of the FSM states. For example, FIG. 2A depicts an excerpt of a FSM showing possible transitions from one state to other states. Consider a randomly selected initial state S' 100. The next possible states may include an abundance of steps of one specific characteristic 102 and a single next state of another characteristic 104. For example, the characteristic may be the sum of bits of each state being even (e.g., for characteristic the states exhibiting 102—hereinafter "even states"), or odd (e.g., for the state exhibiting characteristic 104—hereinafter: "odd state"). In the example depicted in FIG. 2A the vast majority of the possible next states are even, whereas only one state is odd. Since a SAT solver is input directed and is typically based on working with a statistical distribution, it is highly probable that the next step would take the RCS to one of the abundant states 102, rather than to the scarce state 104. A problem that may arise from the RCS is that after a prime state was randomly selected, the next steps that would follow do not reveal and counter example, although a counter example may be present in the FSM. Furthermore, there is a possibility of reaching a dead-end that would prevent proper coverage of the entire design, or significant portions of the design.

According to some embodiments of the present invention, it may be advantageous to increase the probability of hitting scarce states in the process of the model checking, and methods and systems in accordance with some embodiments of the present invention aim to achieve that.

In essence, a method for generalized next-state-directed constrained random simulation, according to some embodiments of the present invention, takes the unrolling technique like in BMC, but instead of going over and over through the same states like in RCS, it seeks to enhance the coverage of various states of the FSM, by generalizing, so as to hit different first states for each step of the unrolling, and also perform random advance, which may take each step of the unrolling through different states, rather than the same states, thus increasing the coverage of this particular form of model checking.

Figure 3:
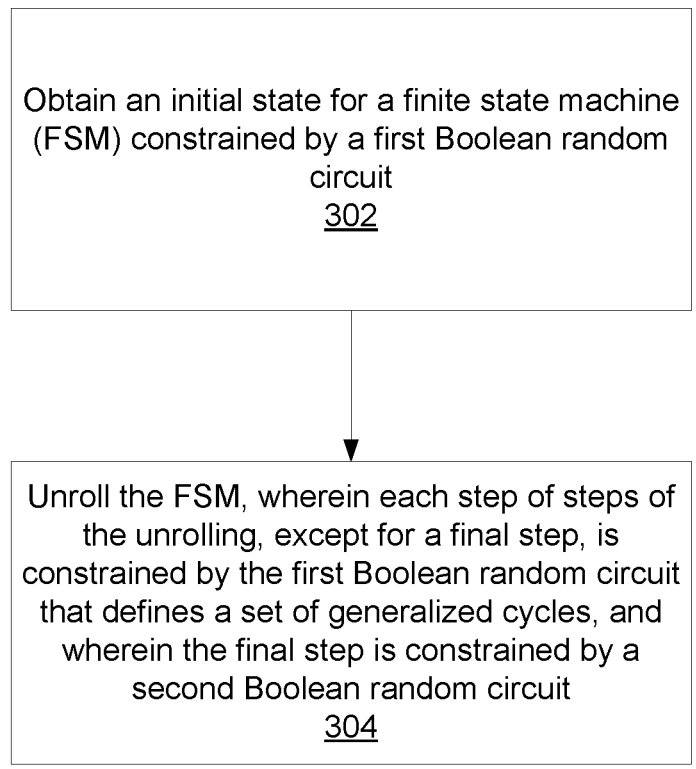
FIG. 3 illustrates a method for generalized next-state-directed constrained random simulation, according to some embodiments of the present invention.

A method 300 for generalized next-state-directed constrained random simulation according to some embodiments of the present invention is depicted in FIG. 3. Method 300 according to some embodiments of the present invention may include obtaining 302 an initial state for a finite state machine (FSM) constrained by a first Boolean random function.

Method 300 may also include unrolling 304 the FSM, wherein each step of steps of the unrolling, except for a final step, is constrained by the first Boolean random circuit that defines a set of generalized cycles, and wherein the final step is constrained by a second Boolean random circuit.

The obtaining of the initial state for the FSM may include, for example, providing an initial state function I(S) to a SAT solver and obtaining from hat SAT solver a satisfying assignment of an initial state for the FSM being tested.

Two Boolean circuits are considered: I, which encodes a set of initial states; and T, which encodes a transition relation on a set of states. Next is generalizing the specific initial state. By "generalizing" is meant, in the context of the present specification, that instead of simply considering the initial state with its actual specific register values, a random Boolean circuit over the variables for the registers of that state, at least one or more of the registers is selected, which accepts 1 for $S_0$ and possibly for other states and zero otherwise. The property is checked for $S_0$ and if it holds the process continues. The simulation, according to some embodiments of the present invention, maintains a generalized trace (random walk), which is an initially-empty vector of generalized cycles, each being a Boolean circuit defined on the state variables. At the first step of the simulation, the formula $I(S_i)$ is fed to a SAT solver. If the SAT solver finds a satisfying assignment, then the first generalized cycle of the maintained generalized trace is initialized with a random circuit $R_1$, chosen at random from the set of all circuits that accept the assignment found for $s_1$.

At the kth step (k>1 and is an integer selected form an increasing set of integers), the generalized trace includes k−1 generalized cycles, and is extended by one generalized cycle, for example, as follows (other sequences and formulas may be used):

The formula $$I(s_1) \wedge \bigwedge_{i=1}^{k-1} [R_i(s_i) \wedge T(s_i, s_{i+1})] \wedge Q(s_k)$$

Where $I(s_1)$ is a Boolean initial state function, $R_i$ is first Boolean random circuit that is chosen at random from a set of Boolean circuits that accept that initial state, Q is a second Boolean random circuit. The formula may be fed or provided to the SAT solver. If the SAT solver finds a satisfying assignment, then the generalized trace is extended with a random circuit $R_k$, chosen at random from the set of all circuits that accept the assignment found for state $s_k$.

If the SAT solver does not find a satisfying assignment, then the experiment is repeated with a freshly chosen Q. In some cases the solver can deduce that no matter what Q is, no satisfying assignment can be found; in such cases the search is either backsteped, by repeating the previous step (because of the randomization the unrolling may take another direction, which may then progress further), or restarted from the beginning with a newly assigned initial state.

A random sequences of states is sought, subject to these sequences starting each at one of the initial states defined by I, and following the transition relation defined by T. Towards that end a sequence S of Boolean circuits is maintained (which is initially the empty sequence), and reiterated; at each iteration I, T, and S are used to produce one of the desired random sequence of states, and add a new circuit to the end of S.

At the k-th iteration (k>0), I and T are used for encoding concisely the set of all sequences of k states that start at an initial state and follow the transition relation. Another constraint is added dictating that the j-th cycle in the encoding (j<k) satisfies the j-th circuit in S. Lastly, a random circuit is selected and the constraint dictating that the last (k-th) cycle in the encoding satisfies this circuit is added. Then, a SAT solver is employed to pick one sequence from that encoding, if such a sequence exists. If the SAT solver finds one such sequence then it is output as one of the desired sequences of states; then a random circuit is selected that satisfies the last state in that sequence, and add this circuit to the end of S. If the SAT solver finds that no such sequence exists, then the process goes backtrack and the search resumes.

Q may be chosen in such a way so as to influence the random walk to be directed to scarce states (104 in FIG. 2A). For example, random circuit Q may be designed such that the weighted probability of getting to an even state or an odd state is equal (e.g., 50-50), such that despite the scarcity of odd states 104, the chances of getting to that state are considerably raised. In other embodiments otherwise predetermined weights may be chosen.

Figure 2C:
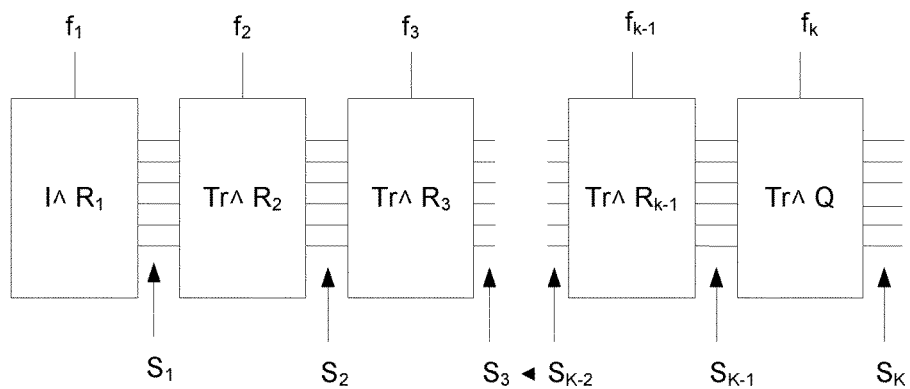
FIG. 2C an ILA representation of a sequential circuit unrolling an FSM using a generalized next-state-directed constrained random simulation approach, according to some embodiments of the present invention.

FIG. 2C illustrates unrolling an FSM using a generalized next-state-directed constrained random simulation approach, according to some embodiments of the present invention.

The randomization, dictated by the random circuit used in obtaining an initial state of the FSM, may make it possible for the unrolling process to start each step (cycle) at an initial state that is unnecessarily the same initial state that is used in other steps of the unrolling process. Thus, in the example shown in FIG. 2C, the first step of the unrolling may start with the assignment of a specific initial state by the first block on the left, which represent the function I/\R$_1$, where I is the initial state function and R is a random circuit that is designed to may randomly select an initial state for the first step and unrolling the first (left) and last (right) blocks. The last block represents the function Tr/\Q (where Q is a second random circuit). A second step unrolls the first, second and last blocks. The unrolling process continues to add one block for each step (cycle) until the last step where the entire row of blocks unroll.

The random circuits used in the process of unrolling may thus, in some embodiments of the invention, significantly increase the coverage of states of the FSM, far more than in the BMC process. The randomization factor may greatly contribute to enhanced coverage of states of the FSM in the unrolling according to some embodiments of the present invention.

Figure 4:
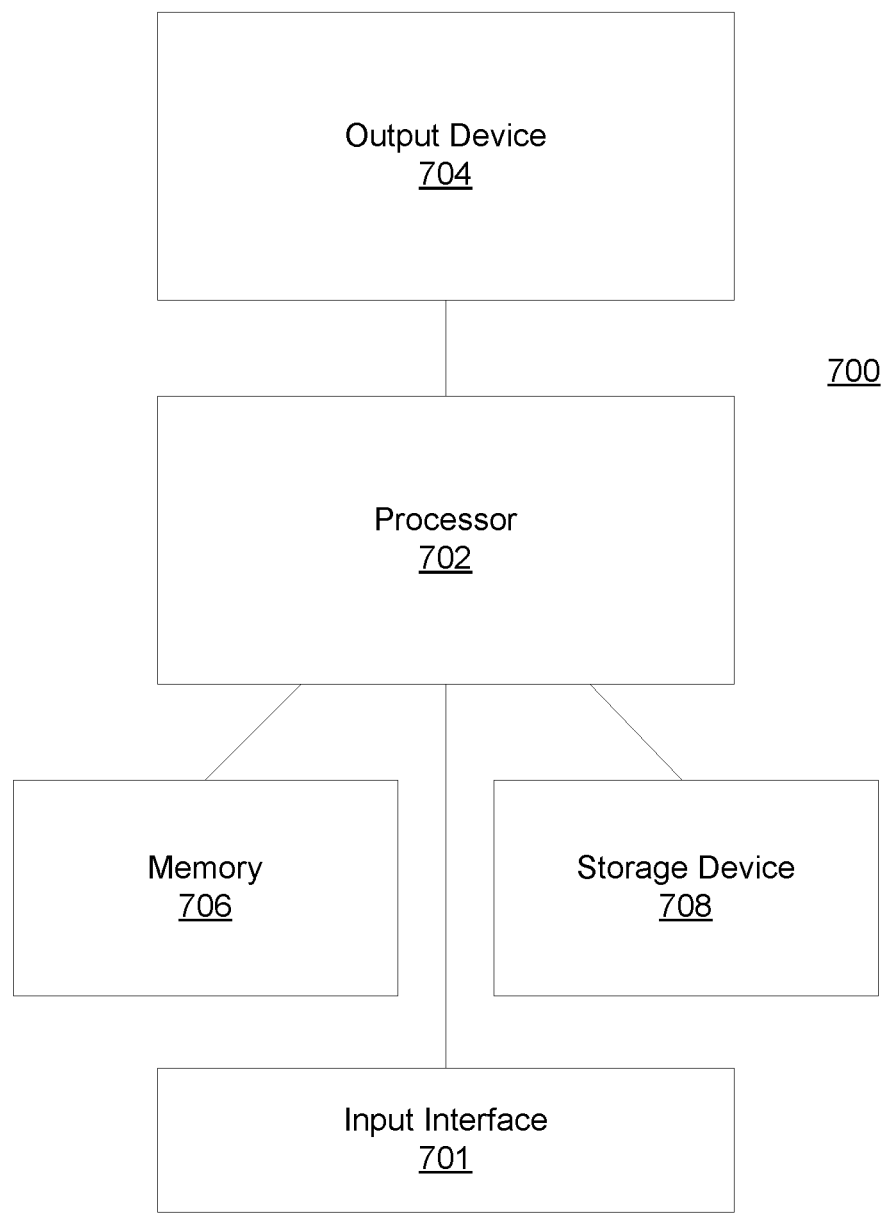
FIG. 4 illustrates a system 700 for generalized next-state-directed constrained random simulation, according to some embodiments of the present invention.

FIG. 4 illustrates a system 700 for generalized next-state-directed constrained random simulation, according to some embodiments of the present invention. System 700 may include a processor 702 (e.g. single processor or a processing unit; a unit that includes a plurality of processors, on a single machine or distributed on a plurality of machines) for executing a method according to some embodiments of the present invention. Processing unit 702 may be configured, for example, to provide to a SAT solver an initial state function relating to a FSM representation of a device under test; obtain from the SAT solver a satisfying assignment of an initial state for the FSM; and recursively, perform a random walk of one or a plurality of steps, maintaining a generalized trace, using a random circuit, and checking at each step whether a property holds for a state corresponding to that step.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for generalized next-state-directed constrained random simulation comprising:
obtaining an initial state s$_1$ for a finite state machine (FSM) that models a design of an electronic circuit of a device under test, the initial state assigning values to each register of the device under test, by providing an initial state function relating to the FSM to a satisfiability problem (SAT) solver to obtain register values that satisfy the initial state function;

generalizing the initial state by randomly selecting a first Boolean random circuit from a set of Boolean circuits that are satisfied by the initial state;

unrolling the FSM, wherein at a kth step (k>1) of steps of the unrolling, the unrolling includes finding a state $s_k$ for which the following formula is satisfiable:

$$I(s_1) \wedge \bigwedge_{i=1}^{k-1} [R_i(s_i) \wedge Tr(s_i, s_{i+1})] \wedge Q(s_k)$$

where $I(s_1)$ is an initial state function, $R_i$ is the first Boolean random circuit, $T_r$ is a Boolean transition function indicating the existence of a transition from state $s_j$ to state $s_{j+1}$, and Q is a second Boolean random circuit that is satisfied by state $s_k$; and generalizing using a third Boolean random circuit $R_k$ chosen at random from the set of Boolean circuits that are satisfied by state $s_k$.

2. The method of claim 1, further comprising checking in each of the steps whether a safety property holds for that step.

3. The method of claim 1, wherein if no satisfying assignment is found for the formula, a previous step is repeated.

4. The method of claim 1, wherein if no satisfying assignment is found for the formula the method further comprises assigning a new initial state.

5. A system for generalized next-state-directed constrained random simulation comprising:

a memory, and a processor configured to:

provide a satisfiability problem (SAT) solver with an initial state function relating to a finite state machine (FSM) that models a design of an electronic circuit of a device under test;

obtain an initial state $s_1$ for the FSM, the initial state assigning values to each register of the device under test;

generalize the initial state by randomly selecting a first Boolean random circuit from a set of Boolean circuits that are satisfied by the initial state;

unroll the FSM, wherein at a kth step (k>1) of steps of the unrolling, the unrolling includes finding a state $s_k$ for which the following formula is satisfiable:

$$I(s_1) \wedge \bigwedge_{i=1}^{k-1} [R_i(s_i) \wedge Tr(s_i, s_{i+1})] \wedge Q(s_k)$$

where $I(s_1)$ is an initial state function, $R_i$ is the first Boolean random circuit, $T_r$ is a Boolean transition function indicating the existence of a transition from state $s_j$ to state $s_{j+1}$, and Q is a second Boolean random circuit that is satisfied by state $s_k$; and generalize using a third Boolean random circuit $R_k$ chosen at random from the set of Boolean circuits that are satisfied by state $s_k$.

6. The system of claim 5, wherein the processor is further configured to check in each of the steps whether a safety property holds for that step.

7. The system of claim 5, wherein if no satisfying assignment is found for the formula then a previous step is repeated.

8. The system of claim 5, wherein if no satisfying assignment is found for the formula in claim 5, then assigning a new initial state.

9. A non-transitory computer readable storage medium for generalized next-state-directed constrained random simulation, having stored thereon instructions that when executed by a processor will cause the processor to:

provide a satisfiability problem (SAT) solver with an initial state function relating to a finite state machine (FSM) that models a design of an electronic circuit of a device under test;

obtain an initial state from the SAT solver for the FSM, the initial state assigning values to each register of the device under test;

generalize the initial state by randomly selecting a first Boolean random circuit from a set of Boolean circuits that are satisfied by the initial state;

unroll the FSM, wherein at a kth step (k>1) of steps of the unrolling, the unrolling includes finding a state $s_k$ for which the following formula is satisfiable:

$$I(s_1) \wedge \bigwedge_{i=1}^{k-1} [R_i(s_i) \wedge Tr(s_i, s_{i+1})] \wedge Q(s_k)$$

where $I(s_1)$ is an initial state function, $R_i$ is the first Boolean random circuit that is chosen at random from a set of Boolean circuits that accept that initial state, $T_r$ is a Boolean transition function indicating the existence of a transition from state $s_j$ to state $s_{j+1}$, and Q is a second Boolean random circuit that is satisfied by state $s_k$; and generalize using a third Boolean random circuit $R_k$ chosen at random from the set of Boolean circuits that are satisfied by state $s_k$.

10. The non-transitory computer readable storage medium of claim 9, wherein the instructions when executed cause the processor to in each of the steps whether a safety property holds for that step.

11. The non-transitory computer readable storage medium of claim 9, wherein the instructions when executed cause the processor to, if no satisfying assignment is found for the formula, repeat a previous step.

12. The non-transitory computer readable storage medium of claim 9, wherein the instructions when executed cause the processor to, if no satisfying assignment is found for the formula, assign a new initial state.

* * * * *